US008081548B2

(12) United States Patent
Mishima et al.

(10) Patent No.: US 8,081,548 B2
(45) Date of Patent: Dec. 20, 2011

(54) METHOD OF EVALUATING CHARACTERISTICS OF MULTILAYER OPTICAL RECORDING MEDIUM

(75) Inventors: Koji Mishima, Tokyo (JP); Hiroyasu Inoue, Tokyo (JP); Takashi Kikukawa, Tokyo (JP); Tetsuya Nishiyama, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/864,437

(22) PCT Filed: Jan. 27, 2009

(86) PCT No.: PCT/JP2009/000303
§ 371 (c)(1),
(2), (4) Date: Jul. 23, 2010

(87) PCT Pub. No.: WO2009/096171
PCT Pub. Date: Aug. 6, 2009

(65) Prior Publication Data
US 2010/0296377 A1    Nov. 25, 2010

(30) Foreign Application Priority Data
Jan. 29, 2008    (JP) .................................. 2008-017408

(51) Int. Cl.
*G11B 20/18* (2006.01)

(52) U.S. Cl. .................. 369/53.2; 369/53.41; 369/94
(58) Field of Classification Search .............. 369/53.2, 369/53.41, 94
See application file for complete search history.

(56) References Cited

U.S. PATENT DOCUMENTS

| 7,180,849 B2 * | 2/2007 | Hirokane et al. ............. 369/286 |
| 2002/0136115 A1 * | 9/2002 | Kadlec et al. ............. 369/44.29 |
| 2003/0095487 A1 * | 5/2003 | Nishizawa et al. ........ 369/53.23 |

FOREIGN PATENT DOCUMENTS

| JP | 2005228368 A | 8/2005 |
| JP | 2009043320 A | 2/2009 |

* cited by examiner

*Primary Examiner* — Wayne Young
*Assistant Examiner* — Brenda Bernardi
(74) *Attorney, Agent, or Firm* — Porzio, Bromberg & Newman, P.C.

(57) ABSTRACT

A multilayer optical recording medium having three or more information recording layers is irradiated with a laser beam, and a first signal obtained from the reflected laser beam is subjected to a frequency filter. A second signal obtained by filtration through a high-pass filter is used to evaluate the characteristics of the multilayer optical recording medium. In this manner, even in a multilayer optical recording medium having three or more information recording layers, the influence of the variation of the thickness and material of the information recording layers and the influence of the variation of the thickness of a spacer layer can be clearly determined and evaluated.

17 Claims, 17 Drawing Sheets

(A)

(B)

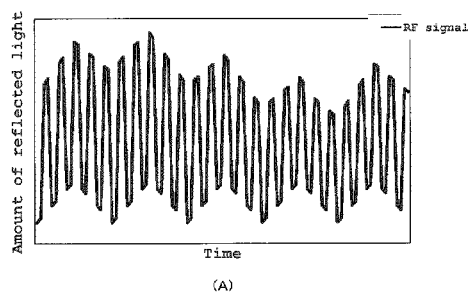 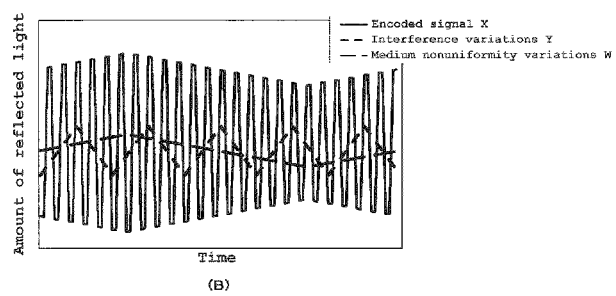
Fig. 4A
Fig. 4B (A)

(B)

| | Number of layers | Disc rotation during deposition of L0 | Thickness of L1 spacer layer | Thickness of L2 spacer layer | Thickness of L3 spacer layer | Function |
|---|---|---|---|---|---|---|
| Sample A | Four | Yes | 13 μm | 21 μm | 17 μm | |
| Sample B | Four | No | 13 μm | 21 μm | 17 μm | Thickness variations |
| Sample C | Four | Yes | 15 μm | 21 μm | 15 μm | Interlayer crosstalk |
| Sample D | Four | No | 15 μm | 21 μm | 15 μm | Thickness variations +Interlayer crosstalk |

Fig.8

|  | Function | Reflection variations | Width of Pw margin for jitter |
|---|---|---|---|
| Sample A |  | 0.12 | 28% |
| Sample B | Thickness variations | 0.18 | 15% |
| Sample C | Interlayer crosstalk | 0.28 | 27% |
| Sample D | Thickness variations +Interlayer crosstalk | 0.44 | 14% |

Fig.9

|  | Function | Reflection variations R8Hhpf | Width of Pw margin for jitter |
|---|---|---|---|
| Sample A |  | 0.12 | 28% |
| Sample B | Thickness variations | 0.17 | 15% |
| Sample C | Interlayer crosstalk | 0.13 | 27% |
| Sample D | Thickness variations +Interlayer crosstalk | 0.21 | 14% |

Fig.10

| Cut-off frequency of high-pass filter | Reflection variations R8Hhpf |
|---|---|
| 100Hz | 0.70 |
| 300Hz | 0.67 |
| 500Hz | 0.55 |
| 1kHz | 0.35 |
| 3kHz | 0.13 |
| 5kHz | 0.13 |
| 10kHz | 0.13 |
| 30kHz | 0.13 |
| 50kHz | 0.13 |
| 100kHz | 0.13 |
| 300kHz | 0.13 |
| 500kHz | 0.13 |

Fig.11

| Cut-off frequency of high-pass filter | Reflection variations R8Hhpf Linear velocity 9.84m/s | Reflection variations R8Hhpf Linear velocity 19.68m/s |
|---|---|---|
| 100Hz | 0.73 | 0.74 |
| 300Hz | 0.70 | 0.73 |
| 500Hz | 0.65 | 0.70 |
| 1kHz | 0.55 | 0.62 |
| 3kHz | 0.29 | 0.40 |
| 5kHz | 0.14 | 0.21 |
| 10kHz | 0.13 | 0.13 |
| 30kHz | 0.13 | 0.13 |
| 50kHz | 0.13 | 0.13 |
| 100kHz | 0.13 | 0.13 |
| 300kHz | 0.13 | 0.13 |
| 500kHz | 0.13 | 0.13 |

Fig.12

|          | Function                                     | Reflection amplitude variations hpf | Width of Pw margin for jitter |
|----------|----------------------------------------------|-------------------------------------|-------------------------------|
| Sample A |                                              | 0.11                                | 28%                           |
| Sample B | Thickness variations                         | 0.22                                | 15%                           |
| Sample C | Interlayer crosstalk                         | 0.17                                | 27%                           |
| Sample D | Thickness variations +Interlayer crosstalk   | 0.25                                | 14%                           |

Fig.13

|  | Function | Reflection variations R8Lhpf | Width of Pw margin for jitter |
|---|---|---|---|
| Sample A |  | 0.14 | 28% |
| Sample B | Thickness variations | 0.28 | 15% |
| Sample C | Interlayer crosstalk | 0.17 | 27% |
| Sample D | Thickness variations +Interlayer crosstalk | 0.31 | 14% |

Fig.14

|  | Function | Reflection variations R8Hlpf | Width of Pw margin for jitter |
|---|---|---|---|
| Sample A |  | 0.09 | 28% |
| Sample B | Thickness variations | 0.18 | 15% |
| Sample C | Interlayer crosstalk | 0.13 | 27% |
| Sample D | Thickness variations +Interlayer crosstalk | 0.20 | 14% |

Fig.15

| Cut-off frequency of low-pass filter | Reflection variations R8Hlpf |
|---|---|
| 1Hz | 0.03 |
| 5Hz | 0.03 |
| 10Hz | 0.11 |
| 20Hz | 0.18 |
| 30Hz | 0.19 |
| 40Hz | 0.19 |
| 50Hz | 0.20 |
| 70Hz | 0.21 |
| 100Hz | 0.24 |
| 150Hz | 0.28 |
| 200Hz | 0.31 |
| 300Hz | 0.38 |

METHOD OF EVALUATING CHARACTERISTICS OF MULTILAYER OPTICAL RECORDING MEDIUM

CROSS REFERENCE TO RELATED APPLICATION

This is a National Stage of International Application No. PCT/JP2009/000303, filed 27 Jan. 2009, which claims the benefit of Application No. 2008-017408, filed in Japan on 29 Jan. 2008, the disclosures of which Applications are incorporated by reference herein.

TECHNICAL FIELD

The present invention relates to a characteristic evaluation method of evaluating the characteristics of a multilayer optical recording medium in which information is recorded in multiple layers.

BACKGROUND ART

Conventionally, optical recording mediums such as CD-DAs, CD-ROMs, CD-Rs, CD-RWs, DVD-ROMs, DVD-Rs, DVD+/−RWs, and DVD-RAMs are widely used for viewing digital video contents and for recording digital data. The recording capacity required for such optical recording mediums is increasing every year. To meet this requirement, the so-called next generation optical discs that can store large video and data files are being commercialized. In such next generation optical discs, the increase in recording capacity is achieved by reducing the wavelength of the laser beam used for recording-reading to 405 nm. For example, in the Blu-ray Disc (BD) standard, which is one of the next generation DVD standards, the numerical aperture of an objective lens is set to 0.85, and this allows as much as 25 GB of data to be recorded in and read from a single recording layer.

To evaluate the quality of such optical recording mediums, reflection variations, for example, are used. The reflection variations are used to evaluate the variations of a signal obtained when a recording layer is read and are useful as a measure of the circumferential uniformity of an optical recording medium. In the (1,7) RLL modulation coding, the reflection variations are represented by the following equation.

$$\text{Reflection variations} = (R8H_{max} - R8H_{min})/R8H_{max}$$

Here, R8H corresponds to the reflectivity of an 8T space in an information recording layer in which the formation of recording marks results in a decrease in reflectivity. $R8H_{max}$ is determined based on the reflectivities of only 8T spaces in one revolution and means the highest one of the reflectivities. $R8H_{min}$ means the lowest one of the reflectivities of the 8T spaces in one revolution. The reason that the reflectivities of 8T spaces in one revolution vary in the range of $R8H_{min}$ to $R8H_{max}$ as described above is due to the circumferential variations of the characteristics of the material and shape of the optical recording medium (for example, variations in the thickness of the information recording layer, variations in the composition of the material, and variation of the thickness of a cover layer). Because of these influences, a bottom jitter value and an optimal recording power value vary in one revolution of the information recording layer. For example, the optimal recording power can vary in one revolution. In such a case, if a low optimal recording power is used to record information over one revolution, jitter in areas in which higher optimal recording powers should be used deteriorates considerably. When a high optimal recording power is used to record information over one revolution, jitter in areas in which lower optimal recording powers should be used deteriorates considerably. Therefore, an optimal recording power that simultaneously satisfies both the requirements is selected. However, the width of the margin for the optimal recording power decreases as the circumferential variations in optimal recording power increases. Due to the above reason, to evaluate reflection variations in an optical recording medium in advance is very important as a measure of uniformity of the optical recording medium.

Meanwhile, it is expected that the size of video and data files will increase more and more in the future. Therefore, it is contemplated to increase the capacities of optical recording mediums by using a multiple stack of information recording layers, as described in Non-Patent Documents (I. Ichimura et. al., Appl. Opt, 45, 1794-1803 (2006) and K. Mishima et. al., Proc. of SPIE, 6282, 628201 (2006)). For Blu-ray standard optical recording mediums, a technology for achieving an ultra large capacity (as much as 200 GB) by providing 6 to 8 information recording layers has been proposed.

DISCLOSURE OF THE INVENTION

Problems to be Solved by the Invention

It is known that interlayer crosstalk that influences reflected light occurs in a multilayer optical recording medium having three or more information recording layers. More specifically, interlayer crosstalk is a phenomenon that the optical path lengths of a main signal RL0 and a stray light component RL2 coincide with each other due to multiple reflection from a focused information recording layer L0 and another recording layer L2 and the reflected signal beams are emitted from the multilayer optical recording medium with their optical axes aligned with each other, as shown in FIG. 17(B). In this case, the variations of the reflected light occur due to the interference between the two light beams even when each of the information recording layers does not include the cause (marks and spaces) of the variations of reflected light. In particular, when the interference occurs with the optical path length difference between the main signal RL0 and the stray light component RL2 satisfying the Bragg condition, the amount of the reflected light increases to cause crosstalk.

The influence of interlayer crosstalk on the reflected light is much greater than the influence of reflection variations caused by the variation of the thicknesses and material compositions of the information recording layers and the variation of the thicknesses of cover and spacer layers, which are taken into consideration in conventional recording mediums. For example, as shown in an exemplary SUM signal output in FIG. 17(A), the variations of the reflected light are relatively small when interlayer crosstalk is suppressed by setting different interlayer distances between information recording layers L0 to L3. However, the variations of the reflected light are very large when crosstalk occurs as shown in FIG. 17(B).

Therefore, in multilayer optical recording mediums, a plurality of causes of reflection variations that are different in characteristics and origins are present simultaneously, and, unfortunately, there is no clear evaluation method for extracting a variation component that has a large influence on recording-reading characteristics.

The present invention has been made in view of the above problem. It is an object of the invention to provide an evaluation method that can appropriately determine, even in a multilayer optical recording medium having three or more information recording layers, material and shape characteristics, such as variation of the thicknesses and materials of the information recording layers and variation of the thicknesses of spacer layers, having a large influence on recording-reading characteristics.

Means for Solving the Problems

The present inventors have compared the jitter when reflection variations generated by interlayer crosstalk are large with the jitter when reflection variations generated by interlayer crosstalk are small and have newly found that the width of the margin for an optimal recording power is almost the same for both cases. More specifically, in a multilayer optical recording medium having three or more information recording layers, when measurement is performed using a conventional method, i.e., based on reflection variations=(R8H$_{max}$−R8H$_{min}$)/R8H$_{max}$, only the influence of interlayer crosstalk is mainly extracted, and the reflection variations are not effectively used as a measure of the uniformity of the multilayer optical recording medium. However, the inventors have found that, if suitable reflection variations can be obtained by appropriately attenuating the interlayer crosstalk, the margin for the optimal recording power can be set to have a sufficient width.

Based on the above idea, the inventors have recognized the need for extracting only reflection variations, such as the variations of the thicknesses and material compositions of information recording layers and the variation of the thicknesses of spacer and cover layers, that influence recording-reading characteristics. Thus, the inventors have created the following novel evaluation method.

To achieve the above object, the present invention provides a characteristic evaluation method of evaluating characteristics of a multilayer optical recording medium having three or more information recording layers, the method comprising: irradiating the multilayer optical recording medium with a laser beam; subjecting a first signal obtained from reflection of the laser beam to a frequency filter; and evaluating the characteristics of the multilayer optical recording medium using a second signal obtained through the frequency filter.

In the characteristic evaluation method of the invention for achieving the above object, the second signal may be obtained from the first signal through the frequency filter by attenuating at least a variation component of the reflection, the variation component being caused by interlayer crosstalk between the information recording layers.

In the characteristic evaluation method of the invention for achieving the above object, the second signal obtained through the frequency filter may contain at least a variation component of the reflection, the variation component being caused by circumferential variations in material or shape characteristics of the multilayer optical recording medium.

In the characteristic evaluation method of the invention for achieving the above object, the frequency filter may be a high-pass filter.

In the characteristic evaluation method of the invention for achieving the above object, the first signal may be an RF signal obtained from light reflected from an information storage region in the information recording layers, and the high-pass filter may transmit the RF signal.

In the characteristic evaluation method of the invention for achieving the above object, the characteristics of the multilayer optical recording medium may be evaluated using variations in amount of reflected light that are contained in the second signal from a space portion in the information storage region.

In the characteristic evaluation method of the invention for achieving the above object, the characteristics of the multilayer optical recording medium may be evaluated using variations in amount of reflected light that are contained in the second signal from a mark portion in the information storage region.

In the characteristic evaluation method of the invention for achieving the above object, a cut-off frequency of the high-pass filter may be set to a value less than a frequency of the RF signal obtained by reading a longest mark and a longest space in the information recording layers.

In the characteristic evaluation method of the invention for achieving the above object, the cut-off frequency of the high-pass filter may be set to a value equal to or less than one-tenth of the frequency of the RF signal obtained by reading the longest mark and the longest space in the information recording layers.

In the characteristic evaluation method of the invention for achieving the above object, a cut-off frequency of the high-pass filter may be set to 0.45 kHz or more.

In the characteristic evaluation method of the invention for achieving the above object, the cut-off frequency of the high-pass filter may be set to 3 kHz or more.

In the characteristic evaluation method of the invention for achieving the above object, the characteristics of the multilayer optical recording medium may be evaluated using amplitude variations of the second signal.

In the characteristic evaluation method of the invention for achieving the above object, the second signal may be normalized using the first signal to evaluate the characteristics of the multilayer optical recording medium.

In the characteristic evaluation method of the invention for achieving the above object, the second signal may be normalized using an amount of reflected light in the first signal to evaluate the characteristics of the multilayer optical recording medium.

In the characteristic evaluation method of the invention for achieving the above object, the second signal may be normalized using an amplitude of the second signal to evaluate the characteristics of the multilayer optical recording medium.

In the characteristic evaluation method of the invention for achieving the above object, the frequency filter may be a low-pass filter.

In the characteristic evaluation method of the invention for achieving the above object, a cut-off frequency of the low-pass filter may be set to a value greater than 1×N (Hz), wherein N is the number of revolutions per second of the multilayer optical recording medium.

In the characteristic evaluation method of the invention for achieving the above object, a cut-off frequency of the frequency filter may be changed to a high frequency side according to an amount of increase in rotation speed of the multilayer optical recording medium.

Effects of the Invention

According to the present invention, the influences of the variation of the thicknesses and materials of information recording layers, the variation of the thicknesses of spacer layers, and the like can be clearly determined and evaluated even in a multilayer optical recording medium having three or more information recording layers.

BRIEF DESCRIPTION OF THE DRAWINGS

FIG. 4 is a set of time charts illustrating the concept of a first signal obtained by reading the multilayer optical recording medium;

FIG. 8 is a table showing the structures of sample mediums used to examine the present evaluation method;

FIG. 9 is a table showing the evaluation results for the sample mediums that are obtained by an evaluation method used as a Comparative Example;

FIG. 10 is a table showing the evaluation results for the sample mediums that are obtained by an evaluation method used as Example 1;

FIG. 11 is a table showing the evaluation results for the sample mediums that are obtained by an evaluation method used as Example 2;

FIG. 12 is a table showing the evaluation results for the sample mediums that are obtained by an evaluation method used as Example 3;

FIG. 13 is a table showing the evaluation results for the sample mediums that are obtained by an evaluation method used as Example 4;

FIG. 14 is a table showing the evaluation results for the sample mediums that are obtained by an evaluation method used as Example 5;

FIG. 15 is a table showing the evaluation results for the sample mediums that are obtained by an evaluation method used as Example 6;

FIG. 16 is a table showing the evaluation results for the sample mediums that are obtained by an evaluation method used as Example 7.

BEST MODE FOR CARRYING OUT THE INVENTION

Hereinafter, embodiments of the present invention will be described in detail with reference to the drawings.

Figure 1:
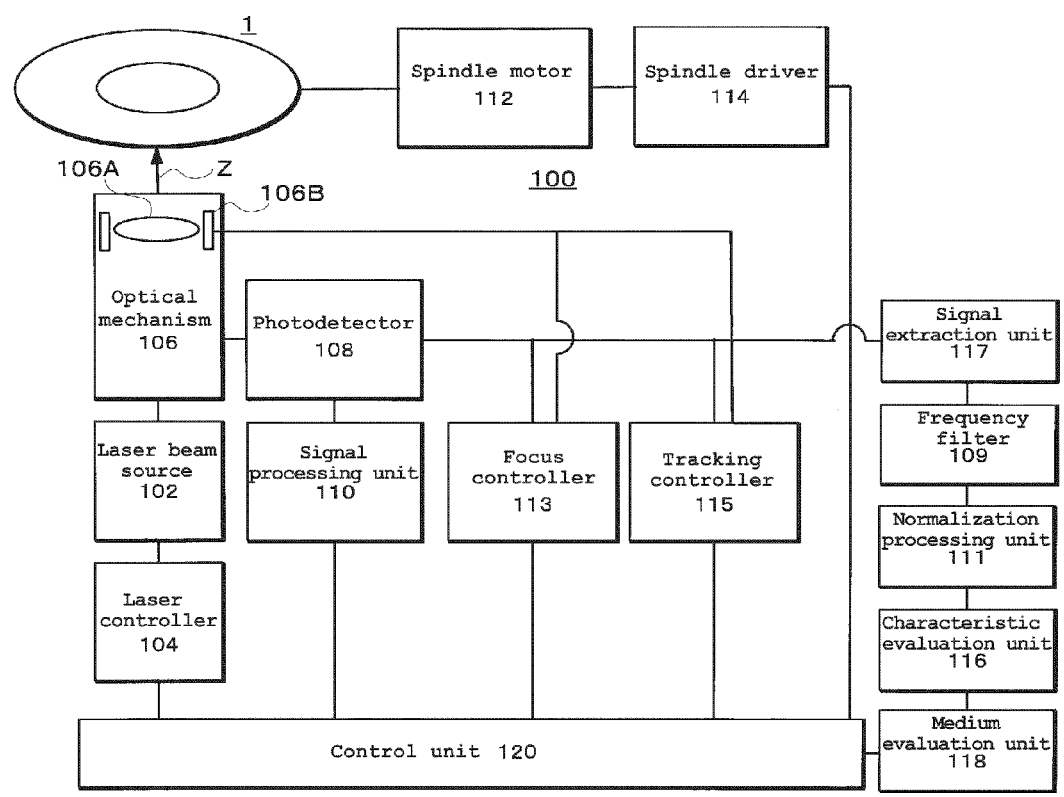
FIG. 1 is a block diagram illustrating the configuration of a characteristic evaluation system that implements an evaluation method according to an exemplary embodiment of the present invention.

FIG. 1 shows the configuration of a characteristic evaluation system 100 and a multilayer optical recording medium 1 evaluated using the characteristic evaluation system 100. The characteristic evaluation system 100 implements a method of evaluating the characteristics of a multilayer optical recording medium in a first embodiment of the present invention. The characteristic evaluation system 100 comprises: a laser beam source 102 that generates a laser beam Z used for reading; a laser controller 104 that controls the laser beam source 102; an optical mechanism 106 that guides the laser beam Z to the multilayer optical recording medium 1; a photodetector 108 that detects the reflection of the laser beam Z; a decoding processing unit 110 that decodes the detected signal; a signal extraction unit 117 that extracts a signal (first signal) from the information detected by the photodetector 108; a frequency filter 109 that is used for filtering the first signal on the basis of frequency; a normalization processing unit 111 that normalizes a second signal obtained through the frequency filter 109; a characteristic evaluation unit 116 that controls the cut-off frequency of the frequency filter 109 and evaluates the characteristics of the multilayer optical recording medium 1 on the basis a signal obtained from the normalization processing unit 111; a medium evaluation unit 118 that determines pass-fail of the multilayer optical recording medium 1 on the basis of the evaluation results from the characteristic evaluation unit 116 and the jitter during reading; a spindle motor 112 that rotates the multilayer optical recording medium 1; a spindle driver 114 that controls the rotation of the spindle motor 112; a focus controller 113 that detects focus error (FE) on the basis of an electric signal sent from the photodetector 108 and drives and controls a lens driving coil 106B in a focusing direction (optical axis direction) using the detected focus error signal; a tracking controller 115 that detects tracking error on the basis of the electric signal sent from the photodetector 108 and drives and controls the lens driving coil 106B in a tracking direction using the tracking error; and a control unit 120 that controls the laser controller 104, the focus controller 113, the spindle driver 114, and the tracking controller 115 in a comprehensive manner. The control unit 120 exchanges decoded reading data with a CPU (central processing unit, not shown) so that necessary information can be recorded and read.

The laser beam source 102 is a semiconductor laser and is controlled by the laser controller 104 to generate the laser beam Z having predetermined power and waveform. The optical mechanism 106 includes an objective lens 106A and a polarization beam splitter and can appropriately adjust the focus of the laser beam Z on an information recording layer. The polarization beam splitter extracts the light reflected from the information recording layer and guides the reflected light to the photodetector 108.

The photodetector 108 receives the reflection of the laser beam Z and converts the received light to an electric signal. The decoding processing unit 110 decodes the reading signal and outputs the decoded binary identification signal to the characteristic evaluation unit 116.

In this embodiment, the frequency filter 109 is a high-pass filter, performs filtering on the first signal obtained from the photodetector 108 using a cut-off frequency described later, and output the resultant signal as the second signal. This cut-off frequency can be freely changed by the characteristic evaluation unit 116.

The normalization processing unit 111 computes a reference value used to normalize the second signal and outputs the computed reference value to the characteristic evaluation unit 116.

In this characteristic evaluation system 100, the wavelength $\lambda$ of the laser beam Z is set to 400 to 410 nm. The numerical aperture NA of the objective lens 106A of the optical mechanism 106 is set to 0.84 to 0.86. More particularly, the wavelength $\lambda$ of the laser beam Z is set to 405 nm, and the numerical aperture NA of the objective lens 106A is set to 0.85. The clock frequency f of the optical reading system is set to 66 MHz. The rotation speed of the multilayer optical recording medium 1 controlled by the spindle driver 114 can be freely controlled in the range of 0 to 10,000 rpm.

Figure 2A:
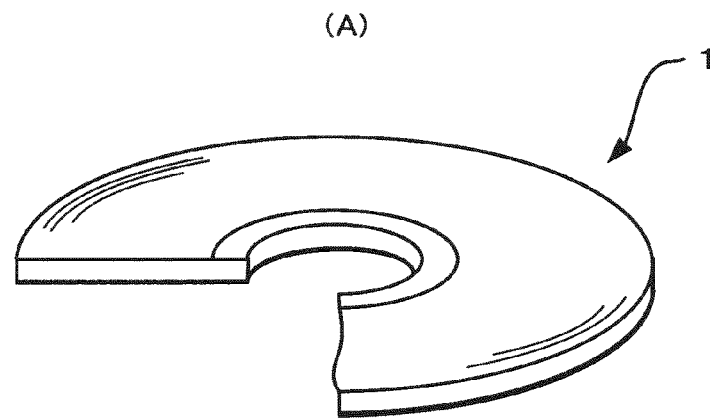
FIG. 2 is a set of a perspective view and an enlarged cross-sectional view exemplifying a multilayer optical recording medium evaluated using the evaluation method.

FIG. 2(A) shows an exemplary general configuration of the multilayer optical recording medium 1 that is used as an object for characteristic evaluation using the characteristic evaluation system 100. The multilayer optical recording medium 1 is used merely as an example of the medium used as an evaluation object. It is appreciated that the present invention is not limited to the method of evaluating this multilayer optical recording medium 1.

Figure 2B:
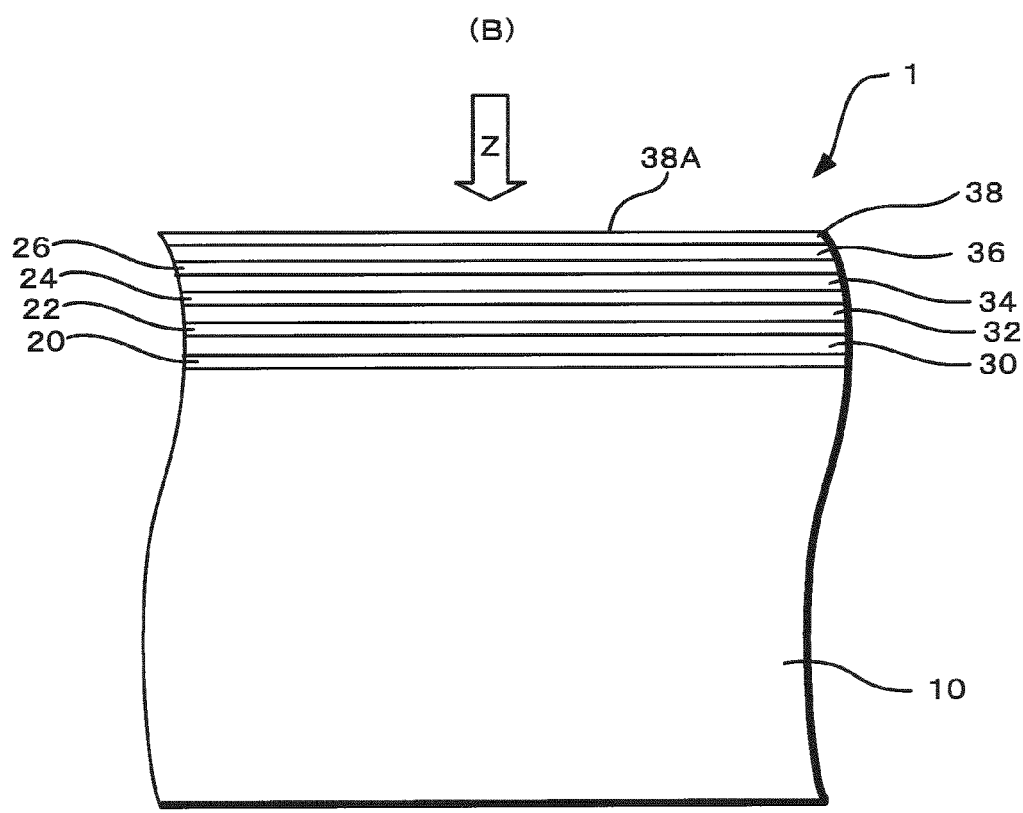

The multilayer optical recording medium 1 is a disc-like medium having an outer diameter of about 120 mm and a thickness of about 1.2 mm. As enlarged in FIG. 2(B), the multilayer optical recording medium 1 includes: a substrate 10; an L0 information recording layer 20; an L1 spacer layer 30; an L1 information recording layer 22; an L2 spacer layer 32; an L2 information recording layer 24; an L3 spacer layer 34; an L3 information recording layer 26; a cover layer 36; and a hard coat layer 38, which are stacked in that order. Therefore, the multilayer optical recording medium 1 has a four-information recording layer structure.

The L0 to L3 information recording layers 20, 22, 24, and 26 are used to store data. Data storage types include the read only type in which data is written in advance and cannot be re-written and the writable type in which a user can write data. In this embodiment, the writable type is employed. More specifically, when the data storage type is the writable type, mediums are classified into the write-once type in which data once written in an area cannot be rewritten and the rewritable type in which data written in an area can be erased and different data can be written in that area. In the present embodiment, the write-once type is exemplified. The data storage types in the L0 to L3 information recording layers 20, 22, 24, and 26 may be different from each other.

All the L1 to L3 spacer layers 30, 32, and 34, the cover layer 36, and the hard coat layer 38 are light-transmittable, so that a laser beam projected from the outside is allowed to pass therethrough. Therefore, the use of the laser beam Z projected onto a light-incident surface 38A of the hard coat layer 38 allows recording-reading of information on-from the L0 to L3 information recording layers 20, 22, 24, and 26. The L3 information recording layer 26 is an information recording layer closest to the light-incident surface 38A of the multilayer optical recording medium 1, and the L0 information recording layer 20 is an information recording layer farthest from the light-incident surface 38A. In the example shown in the present embodiment, the recording capacity of each of the information recording layers 20, 22, 24, and 26 is 25 GB. The recording capacity may be different for each information recording layer and may be set to any value other than 25 GB.

Figure 3:
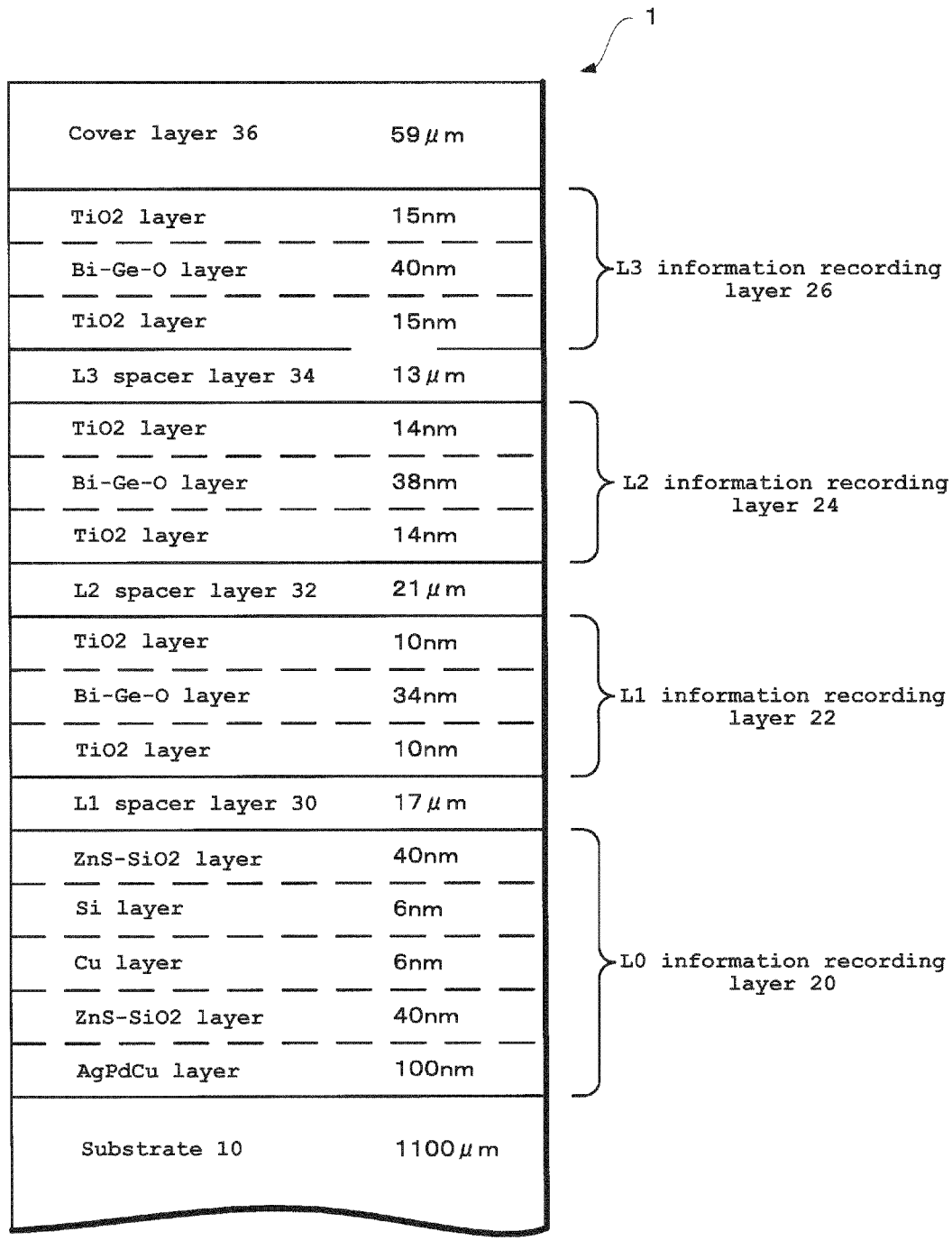
FIG. 3 is an enlarged perspective view illustrating a data storage state in the information recording layers of the multilayer optical recording medium.

As further enlarged in FIG. 3, the substrate 10 is a disc-like member having a thickness of about 1,100 μm, and any of various materials such as glass, ceramic, and resin may be used as the material therefor. In this case, a polycarbonate resin is used. Examples of the usable resin include, in addition to polycarbonate resins, olefin resins, acrylic resins, epoxy resins, polystyrene resins, polyethylene resins, polypropylene resins, silicone resins, fluororesins, ABS resins, and urethane resins. Of these, polycarbonate resins and olefin resins are preferred because of their workability and moldability. Grooves and lands, pit rows, or the like are formed on the surface of the substrate 10 on its information recording layer side in accordance with applications.

The L0 information recording layer 20 includes, from the substrate side, a 100 nm-thick AgPdCu layer (Ag:Pd:Cu=98:1:1 in molar ratio), a 40 nm-thick ZnS—SiO2 layer (ZnS:SiO2=80:20 in molar ratio), a 6 nm-thick Cu layer, a 6 nm-thick Si layer, and a 40 nm-thick ZnS—SiO2 layer. The Cu layer and the Si layer function as inorganic reaction films and are fused and mixed by heat of the laser beam Z, and this results in a different light reflectivity.

The L1 spacer layer 30 is stacked between the L0 information recording layer 20 and the L1 information recording layer 22 and has a function of separating these layers. Grooves (lands), pit rows, or the like are formed on the surface of the L1 spacer layer 30 on its light-incident surface 38A side. Various materials may be used as the material for the spacer layer 30. However, as described above, a light transmitting material must be used to allow the laser beam Z to pass through the spacer layer 30. Preferably, an ultraviolet curable acrylic resin, for example, is used. The thickness of the L1 spacer layer 30 is set to 17 or 15 μm.

The L1 information recording layer 22 includes, from the substrate side, a 10 nm-thick TiO2 layer, a 34 nm-thick Bi—Ge—O layer (Bi:Ge:O=28:2:70 in molar ratio), and a 10 nm-thick TiO2 layer.

The L2 spacer layer 32 is stacked between the L1 information recording layer 22 and the L2 information recording layer 24 and has a function of separating these layers. Grooves (lands), pit rows, or the like are formed on the surface of the L2 spacer layer 32 on its light-incident surface 38A side. The thickness of the L2 spacer layer 32 is set to 21 μm.

The L2 information recording layer 24 includes, from the substrate side, a 14 nm-thick TiO2 layer, a 38 nm-thick Bi—Ge—O layer (Bi:Ge:O=25:7:68 in molar ratio), and a 14 nm-thick TiO2 layer.

The L3 spacer layer 34 is stacked between the L2 information recording layer 24 and the L3 information recording layer 26 and has a function of separating these layers. Grooves (lands), pit rows, or the like are formed on the surface of the L3 spacer layer 34 on its light-incident surface 38A side. The thickness of the L3 spacer layer 34 is set to 13 or 15 μm.

The L3 information recording layer 26 includes, from the substrate side, a 15 nm-thick TiO2 layer, a 40 nm-thick Bi—Ge—O layer (Bi:Ge:O=22:10:68 in molar ratio), and a 15 nm-thick TiO2 layer.

The thickness of the cover layer 36, including the hard coat layer 38, is set to 50 μm. Therefore, in this multilayer optical recording medium 1, the L0 information recording layer 20 is stacked at a position 110 μm form the light incident surface 3A, and the other L1 to L3 information recording layers 22, 24, and 26 are stacked at positions within 110 μm from the light-incident surface 38A.

The grooves formed on the substrate 10 and the L1 to L3 spacer layers 30, 32, and 34 serve as guide tracks for the laser beam Z when data is recorded. By modulating the energy intensity of the laser beam Z traveling along the grooves, recording marks are formed in the information recording layers 20, 22, 24, and 26 on the grooves. The grooves are also used to specify the addresses in the medium, so the address of a specific area in the medium can be obtained from a tracking signal.

Next, a detailed description is given of the frequency filter 109 and the normalization processing unit 111 of the characteristic evaluation system 100 to which the characteristic evaluation method in this embodiment is applied.

The cut-off frequency of the frequency filter 109 (high-pass filter) is set to a value less than the frequency obtained by reading the longest marks and the longest spaces recorded in the L0 to L3 information recording layers 20, 22, 24, and 26. More specifically, the cut-off frequency is set to a value less than the lowest frequency of an RF signal obtained by reading a signal. In consideration of reliability, it is desirable to set the cut-off frequency to a value equal to or less than one-tenth of the lowest frequency of the RF signal. However, this cut-off frequency is set to a value greater than 0.44 kHz. To further increase the reliability, the cut-off frequency is set to 3 kHz or more. In the present embodiment, a pure signal component caused by the differences between the amounts of light reflected from marks-spaces during reading is used as an encoded signal. In the following description, the encoded signal is discriminated from reflection variation components other than the encoded signal that are contained in the read signal.

FIG. 4(A) schematically shows the first signal (RF signal) when a recorded information layer in a multilayer optical recording medium having three or more layers is read. FIG. 4(B) schematically shows variation components of reflected light that are contained in the RF signal. As shown in FIG. 4(B), the variations included in the reflected light emitted from the multilayer optical recording medium 1 in a recorded state include: interference variations Y caused by interlayer crosstalk described above; an encoded signal X that varies according to a recorded signal recorded as recording marks and spaces; and medium nonuniformity variations W that are inherently contained in the encoded signal X as amplitude variations and caused by circumferential variations in the material, shape, thickness, and the like of the multilayer optical recording medium 1. Even when the interference variations Y are present, variations in the amplitude of the encoded signal X do not occur. However, if the material, shape, thickness, and the like of the multilayer optical recording medium 1 vary in the circumferential direction, variations in the amplitude of the encoded signal X occur, and the medium nonuniformity variations W thereby occur in the reflected light.

The encoded signal X is generated based on the differences in reflectivity between marks and spaces formed in the information recording layers 20, 22, 24, and 26 to be read and is generally a high frequency wave of, for example, about 10 MHz, which depends on the reading conditions.

The medium nonuniformity variations W are caused, for example, by variation of thicknesses of the information recording layers 20, 22, 24, and 26 and the spacer layers 30, 32, and 34. Therefore, if the thicknesses vary along one revolution, the medium nonuniformity variations W are a low frequency wave of about 20 Hz, which, however, depends on the reading conditions. The medium nonuniformity variations W are generated mainly because the marks-spaces themselves are formed nonuniformly during recording because of the nonuniformity of the medium.

The interference variations Y are generated when the Bragg condition (the following equation) is satisfied and two light beams interfere with each other to cause the reflected beams to be diffracted.

$$2n \times d \times \sin\theta = k\lambda$$

Here, n is the index of refraction of the material for a spacer layer; d is the optical path difference between a main signal component and a stray light component; $\theta$ is the incident angle of light; k is an integer; and $\lambda$ is wavelength. The optical path difference is mainly due to changes in thicknesses of the spacer layers 30, 32, and 34. In the optical system for BDs, $\lambda=405$ nm. The intensity of focused incident light has a Gaussian distribution, and perpendicularly incident light is most dominant. Therefore, if $\theta=0$, the reflected light is most intensified due to light interference when a condition, $d=135$ (nm)$\times$k (this is obtained by modifying the above equation), is satisfied. The reflected light is most attenuated when the phase difference is one half of the period. The changes in intensity of the reflected light cause the interference variations Y.

Figure 5:
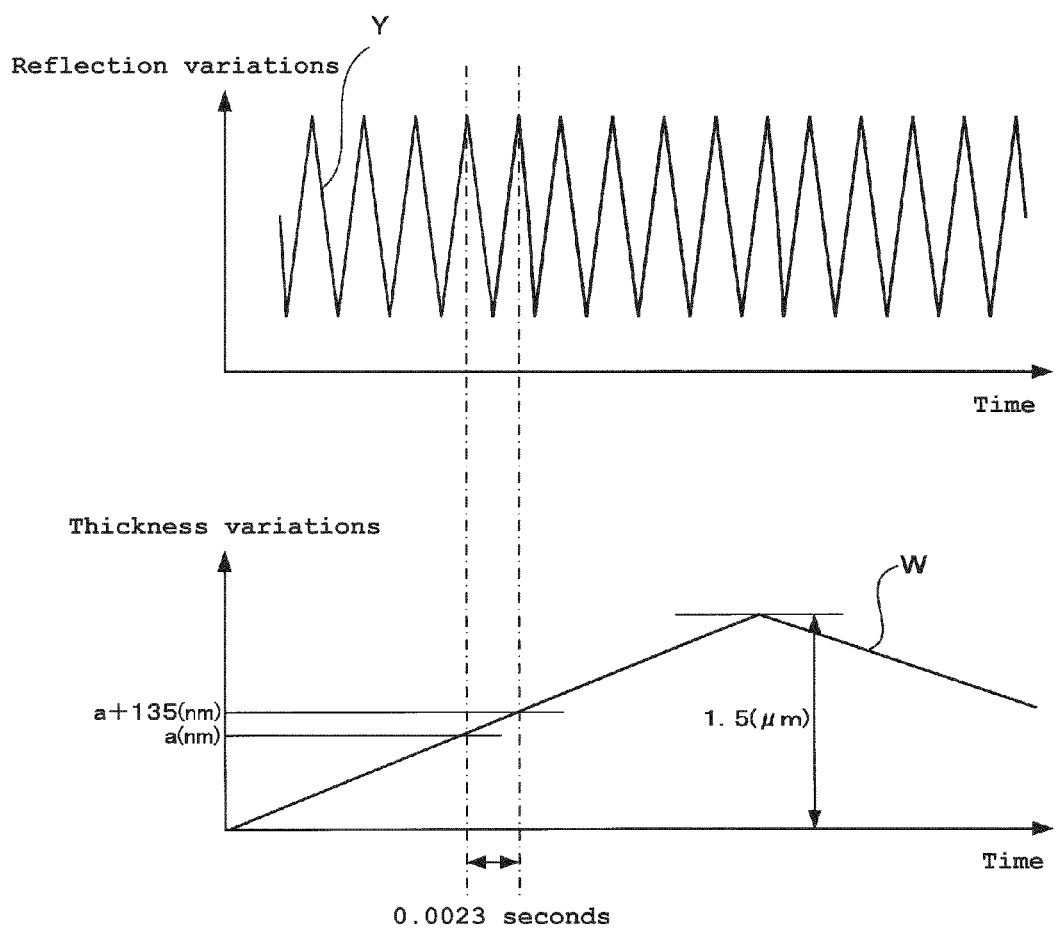
FIG. 5 is a set of time charts illustrating the relationship between interlayer crosstalk and variations in thickness in the multilayer optical recording medium.

Suppose that measurement is performed at a radial position of 40 mm in the multilayer optical recording medium 1 under the condition of a linear velocity of 4.92 m/s. As shown in FIG. 5, if it is assumed that the difference between the maximum and minimum thicknesses of a spacer layer along one revolution is 1.5 μm (3 μm in one rotation cycle) and the thickness varies linearly along one revolution, a variation in thickness of 135 (nm) occurs at every 0.0023 seconds, and this satisfies the Bragg condition. Therefore, the frequency of the interference variations Y generated is 0.44 kHz.

The medium nonuniformity variations W are inherently contained in the encoded signal X. More specifically, the marks-spaces that constitute the encoded signal X are formed in the information recording layers 20, 22, 24, and 26. Therefore, when the material and shape of the multilayer optical recording medium 1 are non-uniform, it is a matter of course that the recorded marks and spaces are non-uniform along one revolution. In other words, since the nonuniformity of the material and shape of the multilayer optical recording medium 1 influences the amplitude of the encoded signal X, the medium nonuniformity variations W are inherently contained in the encoded signal X as an amplitude variation component.

The interference variations Y are caused by the interference that occurs when the Bragg condition is satisfied and have an influence only on reading. Therefore, the interference variations Y do not have an influence on the formation of marks-spaces in the information recording layers. Accordingly, the interference variations Y do not influence the amplitude of the encoded signal X. In other words, since the amplitude of the encoded signal X is not influenced by the interference variations Y, the interference variations Y are not inherently contained in the encoded signal X.

When the cut-off frequency of the high-pass filter (the frequency filter 109 described above) is set to a value greater than 0.44 kHz, it is expected that not only the interference variations Y of about 0.44 kHz but also the medium nonuniformity variations W of about 20 Hz are attenuated in the first signal (RF signal). However, since the medium nonuniformity variations W are inherently contained in the encoded signal X having a frequency higher than the cut-off frequency as described above, the medium nonuniformity variations W cannot be attenuated with the high-pass filter. Therefore, only the interference signal Y can be attenuated.

The interference variations Y can include some disturbances. Therefore, preferably, the cut-off frequency is set to 3 kHz or more to allow for a margin. When the cut-off frequency is greater than the frequency of the encoded signal X, the encoded signal X itself is filtered, so that the medium nonuniformity variations W are not allowed to remain present. Therefore, it is desirable to set the cut-off frequency to a value less than the minimum frequency of the encoded signal X that is determined by a signal from the longest marks and the longest spaces. It is more preferable to set the cut-off frequency to a value equal to or less than one-tenth of the minimum frequency to allow for a margin. In this manner, the interference variations Y are appropriately filtered from the second signal obtained through the frequency filter 109, and the medium nonuniformity variations W are allowed to remain present together with the encoded signal X.

Therefore, by setting the cut-off frequency of the high-pass filter like the frequency filter 109 to 0.44 kHz or more, the interference variations Y of about 0.44 kHz are attenuated in the first signal, and only the encoded signal X remains present in the filtered second signal.

As has been described above, the medium nonuniformity variations W are inherently contained in the encoded signal X. Therefore, the medium nonuniformity variations W remain present together with the encoded signal X. The interference variations Y can include some disturbances. Therefore, preferably, the cut-off frequency is set to 3 kHz or more to allow for a margin. When the cut-off frequency is greater than the frequency of the encoded signal X, the encoded signal X itself is filtered, and the medium nonuniformity variations W are not allowed to remain present. Therefore, it is desirable to set the cut-off frequency to a value less than the minimum frequency of the encoded signal X that is determined by a signal from the longest marks and the longest spaces. It is more preferable to set the cut-off frequency to a value equal to or less than one-tenth of the minimum frequency to allow for a margin. In this manner, the interference variations Y are appropriately filtered from the second signal obtained through the frequency filter 109, and the medium nonuniformity variations W are allowed to remain present together with the encoded signal X.

The normalization processing unit 111 computes a reference value used to normalize the second signal in order to facilitate the evaluation of reflection variations using the second signal. The average amount of reflected light in the first signal or the average amplitude of the second signal may be used as the reference value for normalization. The reference value for normalization can, of course, be computed using any other signal.

Next, a description is given of the characteristic evaluation method using the characteristic evaluation unit 116.

In the characteristic evaluation unit 116 in the present embodiment, two types of evaluation methods are used. In one method, only space portions in the encoded signal X in the second signal are extracted, and the reflection variations (differences) present in the space portions are evaluated. In the other method, only mark portions in the encoded signal X in the second signal are extracted, and the reflection variations (differences) present in the mark portions are evaluated. By obtaining the reflection variations using only the marks or the spaces, the reflection variations due to the medium nonuniformity variations W can be extracted. Preferably, to improve the accuracy of detection, only marks or spaces having lengths close to those of the longest marks or spaces are used, and the reflection variations are extracted over one revolution. The reflection variations can be extracted using, for example, one of two methods. One method is used when the second signal is represented by the absolute value of the amount of reflected light, as in a SUM signal, and the reflection variations are extracted using the maximum and minimum of the absolute value. The other method is used when the second signal is represented as vibrations in positive and negative directions with the zero point used as a reference point, and the reflection variations are extracted using the maximum and minimum of the amplitude of the vibrations.

In the medium evaluation unit 118, a pass-fail determination of the characteristics of the multilayer optical recording medium 1 is made using the extraction results for the reflection variations. More specifically, when the amount of variations is greater than a threshold value used as an evaluation criterion, the characteristics along one revolution are nonuniform. In this case, for example, it is highly possible that a sufficient optimal recording power margin cannot be ensured, and therefore the multilayer optical recording medium 1 is evaluated as "fail."

When the amount of variations is less than the threshold value used as the evaluation criterion, the characteristics along one revolution are uniform, and therefore the multilayer optical recording medium 1 is evaluated as "pass."

Figure 6:
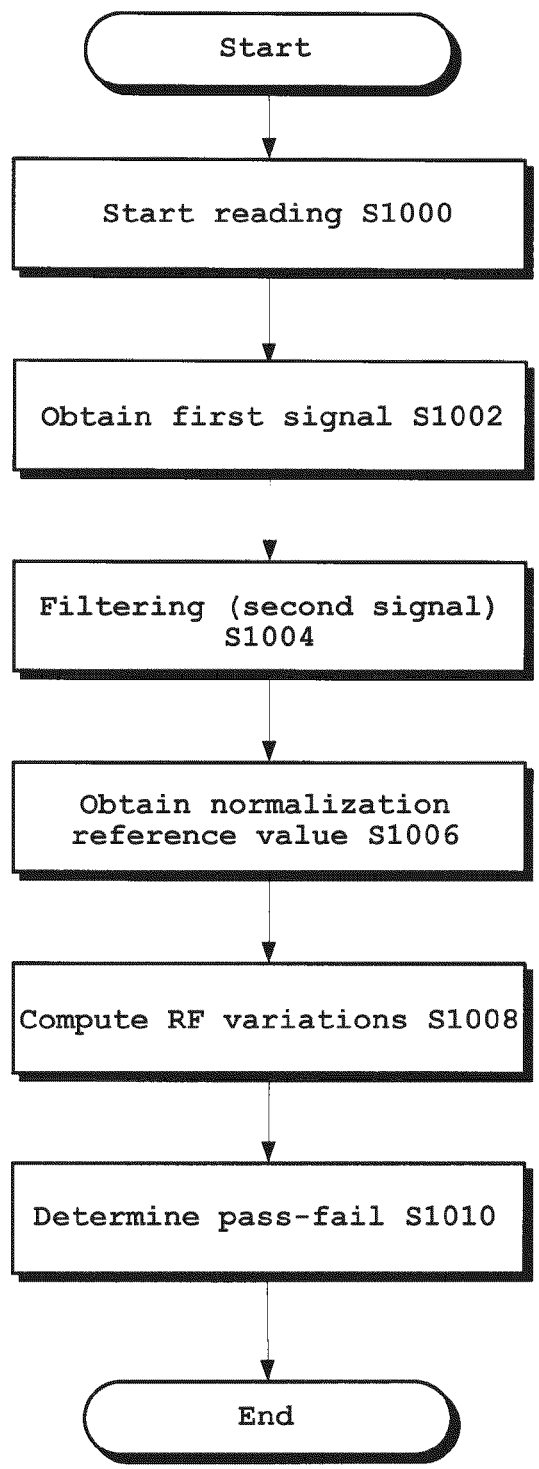
FIG. 6 is a flowchart showing the procedure of the present evaluation method.

FIG. 6 shows an evaluation procedure of the characteristic evaluation system 100. First, in step 1000, reading of the information recording layers 20, 22, 24, and 26 is started. In the evaluation procedure, all the information recording layers 20, 22, 24, and 26 may be evaluated, or one representative information recording layer selected from among the information recording layers 20, 22, 24, and 26 may be evaluated.

Next in step 1002, reflected light obtained by reading is detected by the photodetector 108 to give the first signal. The first signal includes the encoded signal X, the interference variations Y, and the medium nonuniformity variations W, as described above. Then in step 1004, the first signal is filtered through the frequency filter (high-pass filter) 109 to attenuate the interference variations Y, whereby the second signal with the medium nonuniformity variations W remaining present therein is obtained. In this step, the encoded signal X (high frequency wave) is allowed to remain present, and this indirectly allows the medium nonuniformity variations W to remain present. Next, in step 1006, the normalization processing unit 111 computes the reference value used to normalize the second signal. Then in step 1008, the characteristic evaluation unit 116 detects, from the second signal, the variations in amount of light reflected from only mark portions or space portions. The medium nonuniformity variations W are thereby extracted from the second signal. At the same time, the detected reflection variations are normalized using the reference value for normalization described above to perform a pass-fail determination later.

Finally, in step 1010, the medium evaluation unit 118 makes the pass-fail determination on the multilayer optical recording medium 1 using the normalized reflection variations.

Figure 7A:
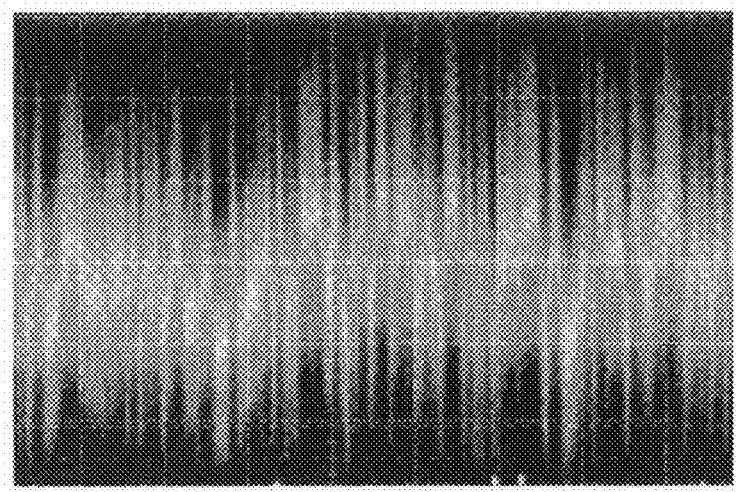
FIG. 7 is a set of diagrams showing an exemplary output of the first signal (A) and an exemplary output of a second signal (B) obtained by the present evaluation method.
Figure 7B:
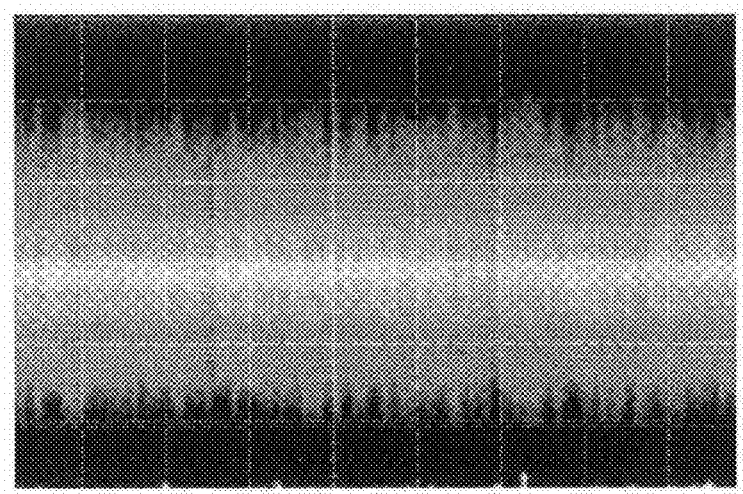
Figures 17A, 17B:
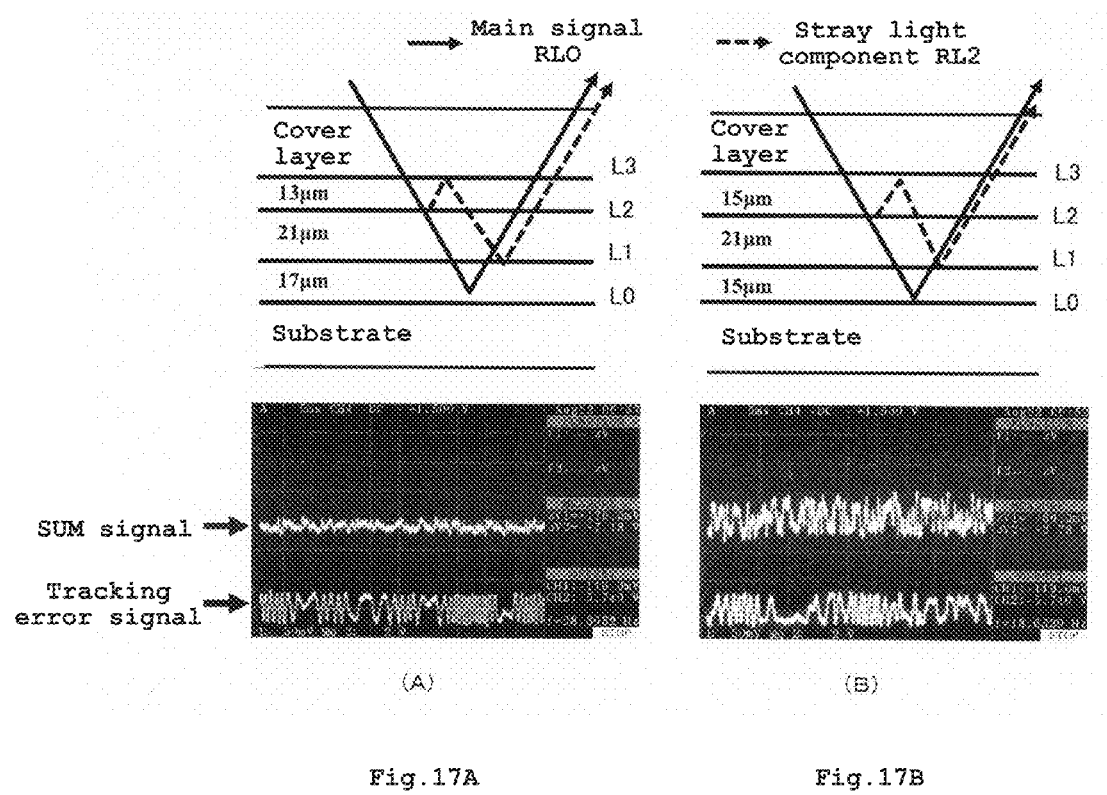
FIG. 17 is a set of diagrams illustrating the principle of the occurrence of interference variations caused by interlayer crosstalk and an exemplary waveform including interference variations in the multilayer optical recording medium.

A specific evaluation example is shown in FIG. 7. FIG. 7 shows examples of the outputs of the first signal and the second signal when the multilayer optical recording medium 1 was evaluated using the characteristic evaluation system 100. In the evaluation, the cut-off frequency of the high-pass filter was set to 3 kHz. FIG. 7(A) shows the output waveform of the first signal before filtering through the high-pass filter, and FIG. 7(B) shows the output waveform of the second signal after filtering through the high-pass filter. As can be seen from the exemplary outputs, the signal before filtering through the high-pass filter included large variations caused by the interference variations Y. However, the interference variations Y were filtered through the high-pass filter, and the encoded signal X and the medium nonuniformity variations W remained present.

As described above, in the characteristic evaluation system 100 according to the first embodiment, the frequency filter 109 is used to generate the second signal in which the interference variations Y caused by interlayer crosstalk are attenuated, and the evaluation is made using the second signal. In this manner, the circumferential variations in characteristics of the multilayer optical recording medium 1 can be analyzed in a reliable manner. Therefore, manufacturing errors in the material, thickness, shape, and the like of the multilayer optical recording medium 1 can be detected with high accuracy, and the quality can thereby be stabilized. In addition, when the characteristic evaluation system 100 is used during recording and reading in a recording-reading system, the evaluation can be performed at any desired timing. This allows appropriate control of the recording-reading power, and the recording-reading characteristics can thereby be improved.

Next, a description is given of a characteristic evaluation method according to a second embodiment of the present invention. A characteristic evaluation system that implements this characteristic evaluation method is the same as the characteristic evaluation system 100 shown in the first embodiment except for the detail of the frequency filter and the detail of the evaluation method of the characteristic evaluation apparatus. Therefore, in the following description of the characteristic evaluation system 200, the same last two digits as in the first embodiment are used to omit the drawing of the system 200 and redundant description, and the differences from the first embodiment are mainly described. Since the multilayer optical recording medium used as the evaluation object is the same as that in the first embodiment, the description thereof is omitted.

A low-pass filter is used as a frequency filter 209 in the characteristic evaluation system 200. The cut-off frequency of the low-pass filter is set to a value greater than 1×N (Hz), where N is the number of revolutions (revolutions per second) of the multilayer optical recording medium 1. More specifically, suppose that the multilayer optical recording medium 1 is rotated under the condition that a linear velocity=4.92 m/s at a radial position=40 mm. Then N is about 20 revolutions/second. Therefore, the cut-off frequency is set to about 20 Hz or more. Since this cut-off frequency must be set to be less than the frequency of the interference variations Y, it is preferable to set the cut-off frequency to 300 Hz or less. More preferably, the cut-off frequency is set to 200 Hz or less.

As also described in the first embodiment, the first signal obtained by a photodetector 208 contains the encoded signal X, the interference variations Y, and the medium nonuniformity variations W. Therefore, in the second embodiment, the interference variations Y are attenuated using the low-pass filter having a cut-off frequency greater than the frequency of the medium nonuniformity variations W and less than the frequency of the interference variations Y to directly allow the medium nonuniformity variations W to remain present. Generally, since the circumferential variations in thickness and material characteristics of the multilayer optical recording medium 1 are present in one to several areas in one revolution, the frequency of the medium nonuniformity variations W is 10×N (Hz) or less. Therefore, by setting the cut-off frequency of the low-pass filter to a value greater than 10×N (Hz) as in the present embodiment, the medium nonuniformity variations W are allowed to remain present, and the interference variations Y can be attenuated appropriately.

With the characteristic evaluation method of the second embodiment, when the first signal does not contain the encoded signal X, i.e., when the first signal is obtained by reading an unrecorded information recording layer, the interference variations Y can be separated from the medium nonuniformity variations W. Therefore, the method is useful for evaluating an unrecorded state of a writable type multilayer optical recording medium 1. However, since the difference in frequency bandwidth between the interference variations Y and the medium nonuniformity variations W is not very large, the cut-off frequency of the low-pass filter must be set appropriately. In particular, since the frequencies of the interference variations Y and the medium nonuniformity variations W contained in the first signal depend on the rotation speed of the multilayer optical recording medium 1 during evaluation, it is preferable to change the cut-off frequency appropriately according to the change of the rotation speed.

<Inspection Results>

First, multilayer optical recording mediums used as evaluation objects were produced. More specifically, sample mediums A to D having the film structure shown in FIGS. 2 and 3 were produced. The thicknesses of the L1 to L3 spacer layers 30, 32, and 34 were changed as shown in FIG. 8, and the L0 information recording layer 20 was deposited under a "rotating" or "non-rotating" condition.

The L0 information recording layer 20 was deposited while the disc was rotated or not rotated, in order to generate circumferential variations in thickness of the L0 information recording layer 20. For example, for samples A and D in which the ZnS—SiO2 layer was deposited while the disc was rotated during deposition, the thickness of the ZnS—SiO2 layer was measured at a radius of 40 mm, and the variations in thickness were found to be 2%. For samples B and D in which the ZnS—SiO2 layer was deposited while the disc was not rotated during deposition, the thickness of the ZnS—SiO2 layer was measured at a radius of 40 mm, and the variations in thickness were found to be 20%. Therefore, when the disc was rotated during deposition, the variations in thickness decreased. When the disc was not rotated, the variations in thickness increased. Therefore, in samples A and D, the first signal obtained by reading contained almost no medium nonuniformity variations W caused by the variations in thickness. However, the first signals obtained from samples B and D contained sufficient amounts of medium nonuniformity variations W caused by the variations in thickness.

In samples C and D in which the thickness of the L1 spacer layer 30 was equal to the thickness of the L3 spacer layer 34, the first signal contains, as one of the components, the interference variations Y caused by interlayer crosstalk. In samples A and B in which the thickness of the L1 spacer layer 30 was different from the thickness of the L3 spacer layer 34, the first signal contains, as one of the components, almost no interference variations Y caused by interlayer crosstalk.

Therefore, by preparing these four discs, four different states can be evaluated, including a state in which the reflection variations are caused only by the variations in thickness of the L0 information recording layer 20 (sample B), a state in which the reflection variations are caused only by interlayer crosstalk (sample C), a state in which the reflection variations are caused both by the variations in thickness of the L0 information recording layer 20 and interlayer crosstalk (sample D), and a state in which reflection variations are not caused by any of these causes (sample A).

Comparative Example

First, to understand the results of a conventional characteristic evaluation method, samples A to D were evaluated by the conventional evaluation method. More specifically, the width of the recording power (Pw) margin for jitter when reading was performed on the L0 information recording layer 20 of each of samples A to D was evaluated using an evaluation apparatus (ODU-1000, product of Pulstec Industrial Co., Ltd., wavelength of the laser beam Z=405 nm, NA of the optical mechanism 106=0.85). As the recording or reading conditions when the width of Pw margin for jitter was measured, the linear rotation velocity was set to 4.92 m/s; the measurement point was set to a point at a radius of 40 mm; and the retrieval length of the first signal used to evaluate jitter was set to 40 ms. The minimum value of PW ($Pw_{min}$) and the maximum value of Pw ($Pw_{max}$) when the jitter exceeded 10% were determined, and the width of the power margin was determined from the results using the following equation.

$$\text{Width of } Pw \text{ margin for jitter} = (Pw_{max} - Pw_{min}) / ((Pw_{max} + Pw_{min})/2)$$

To determine the reflection variations by the conventional method, a random signal was recorded on each of samples A to D using an optimal recording power giving bottom jitter. Then the random signal was read at a measurement point (radius=40 mm) to obtain reflection variations. More specifically, the first signal obtained by the photodetector was used without modification, and the highest portion ($R8H_{max}$) and the lowest portion ($R8H_{min}$) in one revolution were determined from light reflected from positions corresponding to 8T space portions. Then the reflection variations were determined from the results using the following equation.

$$\text{Reflection variations} = (R8H_{max} - R8H_{min})/R8H_{max}$$

FIG. 9 shows the relationships between the reflection variations and the width of the Pw margin for jitter in samples A to D. As can be seen from these results, in the conventional evaluation method, the reflection variations were not correlated with the width of the Pw margin for jitter in samples A to D. For example, even when the reflection variations are large, the Pw margin for jitter can be good, as in sample D. Even when the reflection variations are relatively good, the Pw margin for jitter can be poor, as in sample B. As can be seen, in a multilayer recording medium having three or more information recording layers, the reflection variations obtained by the conventional evaluation method is not suitable as the criterion for determining pass-fail of the medium.

Example 1

A signal was recorded on samples A to D prepared as above under the same conditions as those in Comparative Example 1, and these samples A to D were evaluated using the characteristic evaluation system 100 in the first embodiment. More specifically, the first signal outputted from the photodetector 108 and the second signal obtained by subjecting the first signal to the frequency filter 109 (high-pass filter, 10 kHz) were retrieved and evaluated using the characteristic evaluation system 100.

For the second signal subjected to the high-pass filter, the level of reflection from an 8T space portion was measured at the highest portion ($R8H_{max\text{-}hpf}$) and the lowest portion ($R8H_{min\text{-}hpf}$) in one revolution. For the ordinary first signal not subjected to the high-pass filter, the level of reflection from an 8T space portion was measured at the highest portion ($R8H_{max}$) and the lowest portion ($R8H_{min}$) in one revolution. In the evaluation processing unit 116, the reflection variations $R8H_{hpf}$ in the space portions were determined using the following equation.

$$R8H_{hpf} = (R8H_{max\text{-}hpf} - R8H_{min\text{-}hpf})/((R8H_{max} + R8H_{min})/2)$$

The results for the reflection variations $R8H_{hpf}$ for samples A to D and the width of the Pw margin for jitter measured in Comparative Example 1 are summarized and shown in FIG. 10. As can be seen from these results, when the reflection variations were measured using the high-pass filter of 10 kHz, the reflection variations $R8H_{hpf}$ were correlated with the Pw margin for jitter. Therefore, in the evaluation of a multilayer medium having three or more layers, by using the second signal subjected to the high-pass filter of 10 kHz, the component of the interference variations Y caused by interlayer crosstalk, which are less related to the Pw margin, can be attenuated. In addition, the component of the medium non-uniformity variations W due to the variations in thickness, which have an influence on the Pw margin, can be extracted. This shows that a multilayer recording medium having three or more layers can be evaluated using the present evaluation method.

Example 2

The disc of sample C was used, and a linear velocity of 4.92 m/s and a measurement point at a radius of 40 mm were used. The first signal outputted from the photodetector 108 was subjected to the high-pass filter in which the cut-off frequency was changed in the range of 100 hz to 500 kHz to obtain the second signal. The reflection variations $R8H_{hpf}$ were determined using the following equation.

$$R8H_{hpf} = ((R8H_{max\text{-}hpf} - R8H_{min\text{-}hpf})/(R8H_{max} + R8H_{min})/2)$$

The results are shown in FIG. 11. The reflection variations of sample C were sufficiently small at 3 kHz or higher and were almost unchanged at 3 kHz to 500 kHz. As can be seen from the results, by setting the cut-off frequency of the high-pass filter to 3 kHz or more, the interference variations Y due to interlayer crosstalk can be attenuated sufficiently. When the cut-off frequency of the high-pass filter is too high, the encoded signal X is also filtered. Therefore, desirably, the upper limit of the cut-off frequency is equal to or less than one-tenth of the frequency (minimum frequency) of the encoded signal X that is obtained from the longest marks. In this Example, the evaluation according to the BD specification is used. When the linear velocity=4.92 m/s, the frequency of the longest marks is 4.1 MHz. Therefore, the desirable upper limit of the cut-off frequency is 410 kHz. The cut-off frequency can be set within a relatively wide range of 3 kHz or more and 410 kHz or less.

Example 3

The multilayer optical recording medium of sample C was evaluated while the cut-off frequency of the frequency filter (high-pass filter) 109 of the characteristic evaluation system 100 was changed from 100 Hz to 500 kHz. Two different linear velocities, 9.84 m/s and 19.68 m/s, were used as the evaluation conditions, and the measurement point was set to a point at a radius of 40 mm. The reflection variations $R8H_{hpf}$ were determined from the second signal obtained through the high-pass filter and the first signal before filtering using the following equation.

$$R8H_{hpf} = ((R8H_{max\text{-}hpf} - R8H_{min\text{-}hpf})/(R8H_{max} + R8H_{min})/2)$$

The results are shown in FIG. 12. As can be seen from the results, as the linear velocity increased, the threshold value of the cut-off frequency at which the interference variations Y due to interlayer crosstalk were filtered and the reflection variations were attenuated was shifted to the high frequency side. This shows that when samples A to D are evaluated using different linear velocities, it is preferable to use a high-pass filter suitable for the linear velocity used (or the rotation speed of the multilayer optical recording medium). In particular, when it is desirable to set the cut-off frequency to a value near the frequency threshold value at which the interference variations Y are filtered, the cut-off frequency is changed according to the rotation speed.

Example 4

The multilayer optical recording medium of each of samples A to D was evaluated by setting the cut-off frequency of the frequency filter (high-pass filter) 109 of the characteristic evaluation system 100 to 100 kHz. A random signal was recorded under the same conditions as those in Comparative Example 1. The recorded signal was read, and the maximum amplitude ($8T_{ppmax\text{-}hpf}$) and the minimum amplitude ($8T_{ppmin\text{-}hpf}$) of the amplitudes of 8T signals (marks) in one revolution were measured using the second signal subjected to the high-pass filter. Then the reflection amplitude variations $8P_{hpf}$ were determined using the following equation.

$$8P_{hpf} = (8T_{ppmax\text{-}hpf} - 8T_{ppmin\text{-}hpf})/8T_{ppmax\text{-}hpf}$$

The amplitude $8T_{ppmax\text{-}hpf}$ of the 8T signals used as the reference value for normalization was not changed before and after filtration through the high-pass filter. However, if the measurement is performed using a first signal containing large interference variations Y, measurement errors are likely to occur. Therefore, the computation was made using the second signal subjected to the high-pass filter.

The results of the reflection amplitude variations and the width of the Pw margin for jitter are summarized in FIG. 13. The results for the width of the Pw margin for jitter were the same as those in Comparative Example 1. As can be seen from the results, the reflection amplitude variations were correlated to the width of the Pw margin for jitter. This shows that by measuring the reflection amplitude variations $8P_{hpf}$ using the high-pass filter, the interference variations Y caused by interlayer crosstalk can be attenuated, and a multilayer medium having three or more layers can be evaluated by extracting the influence of the variations in thickness that affect the Pw margin. Therefore, a multilayer medium having three or more layers can be evaluated.

Example 5

The cut-off frequency of the frequency filter (high-pass filter) 109 of the characteristic evaluation system 100 was set to 10 kHz, and the multilayer optical recording medium of each of samples A to D was evaluated. A random signal was recorded under the same conditions as those in Comparative Example 1. During reading, the second signal subjected to the high-pass filter was used, and the level of reflection from an 8T mark portion was measured at the highest portion ($R8L_{max\text{-}hpf}$) and the lowest portion ($R8L_{min\text{-}hpf}$) in one revolution. For the ordinary first signal not subjected to the high-pass filter, the level of reflection from an 8T mark portion was measured at the highest portion ($R8L_{max}$) and the lowest portion ($R8L_{min}$) in one revolution. The reflection variations $R8L_{hpf}$ in the mark portions were determined from the measurement results using the following equation.

$$R8L_{hpf}=(R8L_{max\text{-}hpf}-R8L_{min\text{-}hpf})/((R8L_{max}+R8L_{min})/2)$$

The relationship between the results of the reflection variations and the width of the Pw margin for jitter is summarized in FIG. 14. The results for the width of the Pw margin for jitter were the same as those in Comparative Example 1. As can be seen from the results, the reflection variations were correlated with the width of the Pw margin for jitter. Therefore, in the evaluation of a multilayer medium having three or more layers, by measuring the reflection variations using the high-pass filter of 10 kHz and the above equation, reflection light variations due to crosstalk that do not influence the Pw margin can be attenuated, and only reflection light variations caused by the variations in thickness that influence the Pw margin can be extracted. In this manner the characteristics of the multilayer medium having three or more layers can be evaluated appropriately.

Example 6

Samples A to D in which a random signal was not recorded were prepared, and evaluation was made using the characteristic evaluation system 200 according to the second embodiment. The frequency filter 209 used was a low-pass filter, and the cut-off frequency thereof was set to 50 Hz. For the second signal subjected to the low-pass filter, measurement was made at the highest portion ($R8H_{max\text{-}lpf}$) and the lowest portion ($R8H_{min\text{-}lpf}$) of 8T space portions in one revolution. For the ordinary first signal not subjected to the low-pass filter, the level of reflection from a space portion only for an 8T signal was measured at the highest portion ($R8H_{max}$) and the lowest portion ($R8H_{min}$) in one revolution. The reflection variations $R8H_{lpf}$ were determined from the measurement results using the following equation.

$$R8H_{lpf}=(R8H_{max\text{-}lpf}-R8H_{min\text{-}lpf})/((R8H_{max}+R8H_{min})/2)$$

The relationship between the results of the reflection variations and the width of the Pw margin for jitter is summarized in FIG. 15. The results for the width of the Pw margin for jitter were the same as that in Comparative Example 1. As can be seen from the results, the reflection variations were correlated to the width of the Pw margin for jitter. This shows that by measuring the reflection variations using the low-pass filter of 50 Hz and the above equation, the reflection variations caused by interlayer crosstalk that do not influence the Pw margin of a multilayer medium having three or more layers can be attenuated, and only the reflection variations due to the variations in thickness that have an influence on the Pw margin can be extracted. In Example 6, the reflection variations were measured with no signal recorded. However, the same results can be obtained with a signal recorded. This is because the encoded signal X contained in the second signal is a high frequency component and is therefore removed by the low-pass filter but the medium nonuniformity variations W due to the circumferential variations in the thickness of the multilayer optical recording medium remain present. In other words, the advantage of the present evaluation method is that the reflection variations can be evaluated even when a signal is recorded or not recorded.

Example 7

Sample D was evaluated using the characteristic evaluation system 200. The frequency filter 209 used is a low-pass filter, and the evaluation was performed by setting the linear velocity to 4.92 m/s and the measurement point to a point at a radium of 40 mm while the cut-off frequency of the low-pass filter was changed between 1 Hz and 300 Hz. The results are shown in FIG. 16. When the cut-off frequency of the low-pass filter was between 20 to 70 Hz, the reflection variations were small. However, when the cut-off frequency exceeded 70 Hz, the reflection variations increased. This is because since the frequency of the interference variations Y due to interlayer crosstalk is higher than that of the medium nonuniformity variations W caused by the variations in thickness of the multilayer optical recording medium, the interference variations Y due to interlayer crosstalk are effectively filtered by setting the cut-off frequency to a value between 20 to 70 Hz. In other words, when the frequency of the low-pass filter is set to a value between 20 to 70 Hz, the reflection variations based on the changes in the thicknesses of the information recording layers and the like can be obtained.

As can be seen from the above inspection results, the amplitude of the interference variations Y due to interlayer crosstalk is not substantially changed and is substantially constant, and all the interference variations Y can be filtered using a suitable filter. However, the medium nonuniformity variations W caused, for example, by the variations in the thicknesses of the information recording layers have an influence on the amount of light reflected from the recorded marks and spaces (the encoded signal X). The amplitude of the encoded signal X from the marks-spaces varies depending on the medium nonuniformity variations W. Therefore, when the encoded signal X is allowed to remain present using a frequency filter, the medium nonuniformity variations W due to the variations in thickness also remain present. Therefore, by using a pass filter on the high-frequency side that allows the encoded signal X to pass therethrough, the interference variations Y due to interlayer crosstalk can be attenuated appropriately, and the reflection variations that depend on the variations in thickness and have an influence on the Pw margin can be computed.

Moreover, the frequency of the medium nonuniformity variations W caused by the variations in thickness of the information recording layers is always lower than the frequency of the interference variations Y due to interlayer crosstalk due to the multiple layers. Therefore, the use of a suitable low-pass filter allows the component of interlayer crosstalk due to the multiple layers to be attenuated.

In the above inspection results, the variations in the amount of light and the variations in amplitude are measured only for the component of reflected light corresponding to 8T marks and 8T spaces in the second signal subjected to the high-pass filter. However, in the present invention, the variations in thickness of the information recording layers can be evaluated using other marks and spaces. In other words, the type of the signal used for the evaluation of the reflection variations may be determined appropriately.

In the above Examples, the reflection variations are used to evaluate the variations in the thickness of a multilayer optical recording medium. However, the characteristics of the multilayer optical recording medium can, of course, be evaluated using other measures. More specifically, in the present invention, since the variations in reflected light due to interlayer crosstalk in multiple layers can be removed using an appropriate frequency filter, causes other than interlayer crosstalk that have an influence on the signal characteristics can be extracted. For example, when the degree of encoding Q for 8T signals is used, the following equation may be used.

Degree of encoding $Q$ for $8T$ signals $= (R8H_{hpf} - R8H_{hpf})/((R8H_{max}+R8H_{min})/2-(R8L_{max}+R8L_{min})/2)$ Here, $R8H_{hpf}$ is the amount of light reflected from 8T spaces after filtering through the high-pass filter, and $R8L_{hpf}$ is the amount of light reflected from 8T marks after filtering through the high-pass filter.

In the above embodiments, a write-once type medium is used as the multilayer optical recording medium, but the invention is not limited thereto. The present invention is applicable to any medium of the rewritable type, the ROM type, or the like, so long as it is a multilayer optical recording medium having three or more layers. In the above embodiments, a so-called high-pass filter or low-pass filter is used to attenuate the interference variations due to interlayer crosstalk, but the invention is not limited thereto. More specifically, any other frequency filter such as a band-pass (attenuation) filter may be used so long as it can attenuate the interference variations.

In the above embodiments, the descriptions have been given only of the multilayer optical recording mediums having a four-information recording layer structure, but the invention is not limited thereto. No limitation is imposed on the number of information layers so long as the number of information layers is three or more. In the above embodiments, the descriptions have been given of the interlayer crosstalk when the thicknesses of the spacer layers of the multilayer optical recording mediums are the same, but the invention is not limited thereto. The invention is applicable so long the frequency of the reflection variation component is lower than the frequency of the encoded signal component and the reflection variations have an influence only on a read signal. For example, as the thickness of a spacer layer between two layers decreases, the distance between one information layer to be read and the other information layer decreases. Therefore, since the signals on the photodetector overlap, reflection variations due to interlayer crosstalk occur. However, the influence of this interlayer crosstalk can, of course, be removed.

INDUSTRIAL APPLICABILITY

The present invention can be widely used to evaluate various multilayer optical recording mediums.

The invention claimed is:

1. A characteristic evaluation method of evaluating characteristics of a multilayer optical recording medium having three or more information recording layers, the method comprising:
   irradiating the multilayer optical recording medium with a laser beam; subjecting a first signal obtained from reflection of the laser beam to a frequency filter; and
   evaluating the characteristics of the multilayer optical recording medium using a second signal obtained through the frequency filter;
   wherein the second signal is obtained from the first signal through the frequency filter by attenuating at least a variation component of the reflection, the variation component being caused by interlayer crosstalk between the information recording layers.

2. The characteristic evaluation method of a multilayer optical recording medium according to claim 1, wherein the second signal obtained through the frequency filter contains at least a variation component of the reflection, the variation component being caused by circumferential variations in material or shape characteristics of the multilayer optical recording medium.

3. The characteristic evaluation method of a multilayer optical recording medium according to claim 1, wherein the frequency filter is a high-pass filter.

4. A characteristic evaluation method of evaluating characteristics of a multilayer optical recording medium having three or more information recording layers, the method comprising:
   irradiating the multilayer optical recording medium with a laser beam; subjecting a first signal obtained from reflection of the laser beam to a frequency filter; and
   evaluating the characteristics of the multilayer optical recording medium using a second signal obtained through the frequency filter;
   wherein the frequency filter is a high-pass filter,
   the first signal is an RF signal obtained from light reflected from an information storage region in the information recording layers, and the high-pass filter transmits the RF signal.

5. The characteristic evaluation method of a multilayer optical recording medium according to claim 4, wherein the characteristics of the multilayer optical recording medium are evaluated using variations in amount of reflected light that are contained in the second signal from a space portion in the information storage region.

6. The characteristic evaluation method of a multilayer optical recording medium according to claim 4, wherein the characteristics of the multilayer optical recording medium are evaluated using variations in amount of reflected light that are contained in the second signal from a mark portion in the information storage region.

7. The characteristic evaluation method of a multilayer optical recording medium according to claim 4, wherein a cut-off frequency of the high-pass filter is set to a value less than a frequency of the RF signal obtained by reading a longest mark and a longest space in the information recording layers.

8. The characteristic evaluation method of a multilayer optical recording medium according to claim 7, wherein the cut-off frequency of the high-pass filter is set to a value equal to or less than one-tenth of the frequency of the RF signal obtained by reading the longest mark and the longest space in the information recording layers.

9. The characteristic evaluation method of a multilayer optical recording medium according to claim 3, wherein a cut-off frequency of the high-pass filter is set to 0.45 kHz or more.

10. The characteristic evaluation method of a multilayer optical recording medium according to claim 9, wherein the cut-off frequency of the high-pass filter is set to 3 kHz or more.

11. The characteristic evaluation method of a multilayer optical recording medium according to claim 1, wherein the characteristics of the multilayer optical recording medium are evaluated using amplitude variations of the second signal.

12. A characteristic evaluation method of evaluating characteristics of a multilayer optical recording medium having three or more information recording layers, the method comprising:
    irradiating the multilayer optical recording medium with a laser beam; subjecting a first signal obtained from reflection of the laser beam to a frequency filter; and
    evaluating the characteristics of the multilayer optical recording medium using a second signal obtained through the frequency filter;
    wherein the second signal is normalized using the first signal to evaluate the characteristics of the multilayer optical recording medium.

13. The characteristic evaluation method of a multilayer optical recording medium according to claim 12, wherein the second signal is normalized using an amount of reflected light in the first signal to evaluate the characteristics of the multilayer optical recording medium.

14. The characteristic evaluation method of a multilayer optical recording medium according to claim 12, wherein the second signal is normalized using an amplitude of the second signal to evaluate the characteristics of the multilayer optical recording medium.

15. The characteristic evaluation method of a multilayer optical recording medium according to claim 1, wherein the frequency filter is a low-pass filter.

16. A characteristic evaluation method of evaluating characteristics of a multilayer optical recording medium having three or more information recording layers, the method comprising:
    irradiating the multilayer optical recording medium with a laser beam; subjecting a first signal obtained from reflection of the laser beam to a frequency filter; and
    evaluating the characteristics of the multilayer optical recording medium using a second signal obtained through the frequency filter;
    wherein the frequency filter is a low-pass filter, and
    a cut-off frequency of the low-pass filter is set to a value greater than 1×N (Hz), where N is the number of revolutions per second of the multilayer optical recording medium.

17. A characteristic evaluation method of evaluating characteristics of a multilayer optical recording medium having three or more information recording layers, the method comprising:
    irradiating the multilayer optical recording medium with a laser beam; subjecting a first signal obtained from reflection of the laser beam to a frequency filter; and
    evaluating the characteristics of the multilayer optical recording medium using a second signal obtained through the frequency filter;
    wherein a cut-off frequency of the frequency filter is changed to a high frequency side according to an amount of increase in rotation speed of the multilayer optical recording medium.

* * * * *